(12) United States Patent
Ronen et al.

(10) Patent No.: US 8,581,165 B2
(45) Date of Patent: Nov. 12, 2013

(54) OPTOMECHANICAL MEMS DEVICE INCLUDING A PROOF MASS AND AN ILLUMINATION MITIGATING MECHANISM

(75) Inventors: Aviv Ronen, Haifa (IL); Oren Lahav, Hafia (IL); Segev Ben Itzhak, Kiryat Bialik (IL); Haim Shalev, Karmiel, IL (US); Lior Kogut, Haifa (IL)

(73) Assignee: Rafael Advanced Defense Systems, Ltd., Haifa (IL)

( * ) Notice: Subject to any disclaimer, the term of this patent is extended or adjusted under 35 U.S.C. 154(b) by 239 days.

(21) Appl. No.: 13/145,603

(22) PCT Filed: Jan. 20, 2010

(86) PCT No.: PCT/IB2010/050255
§ 371 (c)(1),
(2), (4) Date: Jul. 20, 2011

(87) PCT Pub. No.: WO2010/084463
PCT Pub. Date: Jul. 29, 2010

(65) Prior Publication Data
US 2012/0026734 A1    Feb. 2, 2012

(30) Foreign Application Priority Data
Jan. 22, 2009    (IL) .................................... 196692

(51) Int. Cl.
*G01J 1/32*    (2006.01)

(52) U.S. Cl.
USPC ........................................... 250/205; 250/216

(58) Field of Classification Search
USPC ............... 250/205, 216, 239, 208.1, 214 AL;
385/31; 340/555–557, 472, 630;
455/456.1, 556.1, 566, 572;
73/514.26–514.32, 504.12–504.16
See application file for complete search history.

(56) References Cited

U.S. PATENT DOCUMENTS

| | | | |
|---|---|---|---|
| 6,350,983 B1 | 2/2002 | Kaldor | |
| 6,861,633 B2 * | 3/2005 | Osborn | ...................... 250/208.1 |
| 7,071,594 B1 | 7/2006 | Yan | |
| 2005/0201425 A1 | 9/2005 | Yakymyshyn | |
| 2006/0082859 A1 | 4/2006 | Huibers | |
| 2006/0131500 A1 | 6/2006 | Dalakos | |

* cited by examiner

Primary Examiner — Que T Le

(57) ABSTRACT

A micro-opto-electro-mechanical system having a proof mass; at least one illumination source for providing illumination; an illumination detector; peripheral electronics; and an illumination mitigating mechanism for mitigating the effect of illumination emitted from the at least one illumination source on the peripheral electronics. According to various embodiments, the illumination mitigating mechanism includes handles disposed on the proof mass, an illumination collimating device, a substrate with a recess, a narrow beam light source, an illumination absorbing layer or optical limiters.

11 Claims, 3 Drawing Sheets

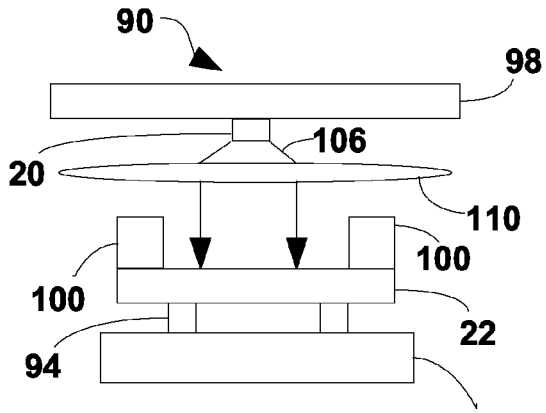
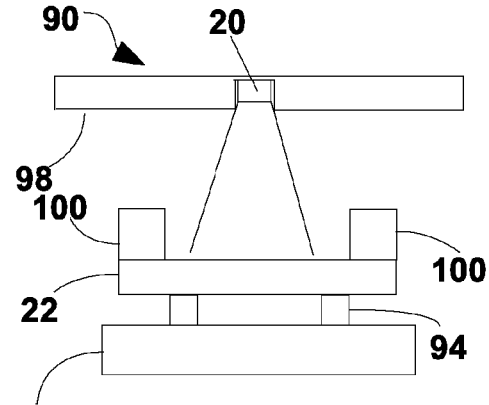
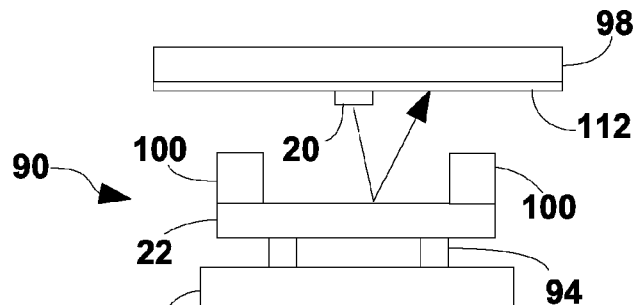
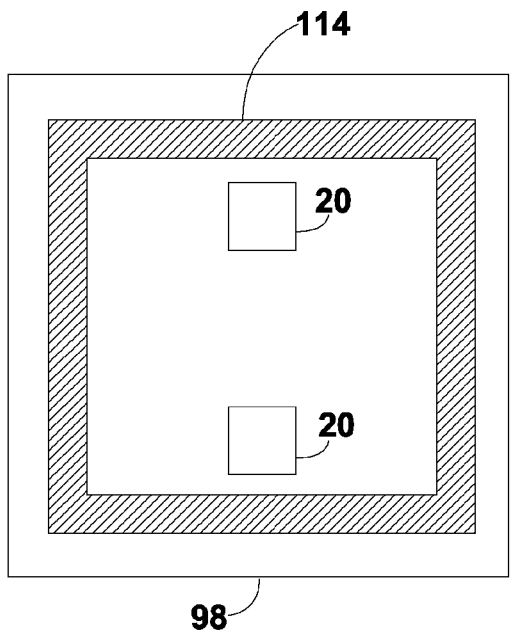
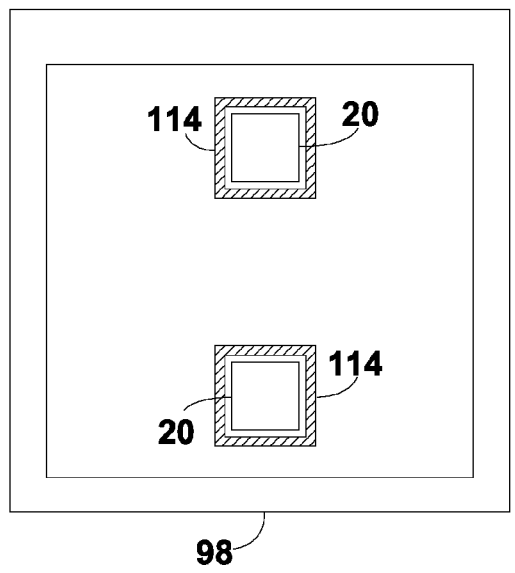

US 8,581,165 B2

OPTOMECHANICAL MEMS DEVICE INCLUDING A PROOF MASS AND AN ILLUMINATION MITIGATING MECHANISM

FIELD OF THE INVENTION

The present invention relates to MEMS (microelectromechanical systems) technology, in particular MEMS employing optical microsensors.

BACKGROUND OF THE INVENTION

Micro-electro-mechanical systems (MEMS) provide an electrical output in response to movement. MEMS are incorporated in an increasing number of sensor and actuator devices especially in applications making use of orientation, alignment and stabilization such as medical devices, photographical equipment, transportation navigation and inertial sensors, weaponry, and so on. MEMS are produced using several known microprocessing techniques, including: photolithography, wet etching, dry etching, evaporation, chemical-vapor deposition, oxidation, etc. is Micro-opto-electromechanical systems (MOEMS) are a special class of MEMS which involves sensing or manipulating optical signals using integrated mechanical and electrical systems.

Micro-electromechanical optical inertial sensing devices make use of the Coriolis effect to detect rotation rate. U.S. Pat. No. 6,350,983 discloses such a micro-electromechanical optical inertial sensing device in which a MEMS proof mass is suspended on cantilevers. U.S. Pat. No. 7,071,594 discloses a MEMS scanning device which is another application of optical MEMS.

SUMMARY OF THE INVENTION

The present invention relates to an improved optical MEMS (microelectromechanical system) device wherein the amount and/or effect of stray light (illumination that is misdirected, reflected light, etc.) is reduced.

The present invention provides a micro-opto electromechanical system (MOEMS) having a proof mass; at least one illumination source for providing illumination; an illumination detector; and peripheral electronics, wherein the system further includes an illumination mitigating mechanism for mitigating the effect of illumination emitted from the illumination source on the peripheral electronics.

A common type of MEMS device uses an illumination source that is blocked or may pass to an illumination sensing element, such as a photodiode. E.g.: Movement of the MEMS device results in a different amount of light being detected by the photodiode whereby the movement can be quantified and the information utilized.

It is an object of the invention to reduce the undesirable effect of noise and parasitic signal resulting from illumination, in MEMS optic sensing devices. Light arriving from the light source is distributed on a photodiode for producing an electrical signal. However, the peripheral electronics devices (e.g. electrostatic discharge diodes, pressure gauges, thermometers and VLSI amplifiers) also can be affected by the illumination, either by direct light or indirect light reflected from various surfaces of the device, for example reflected from electronic circuits of the MEMS device or package, from the illumination system or as a result of scattered light. This undesirable effect imparts a negative influence upon operations of the MEMS device as it adds noise and parasitic signals to the desirable electronic signal and may reduce the dynamic measurement range.

The terms "light" and "illumination" as appear in the specification and claims may be used interchangeably.

BRIEF DESCRIPTION OF THE DRAWINGS

The invention may be understood upon reading of the following detailed description of non-limiting exemplary embodiments thereof, with reference to the following drawings, in which:

FIG. 6 is a schematic sectional side view of the present MOEMS device which includes a collimator for reducing parasitic light;

FIG. 7 is a schematic sectional side view of the present MOEMS device wherein the light source is housed within a substrate;

FIG. 8 is a schematic sectional side view of the present MOEMS device wherein a thin-layer is added to a substrate for absorbing parasitic light;

FIG. 9 is a schematic top view of the substrate of FIG. 8 in which light sources are connected thereto and an optical limiter is connected around all the light sources; and FIG. 10 schematically illustrates a top view of the substrate of FIG. 8 in which light sources are connected thereto and optical limiters are connected around each light source;

Figure 1:
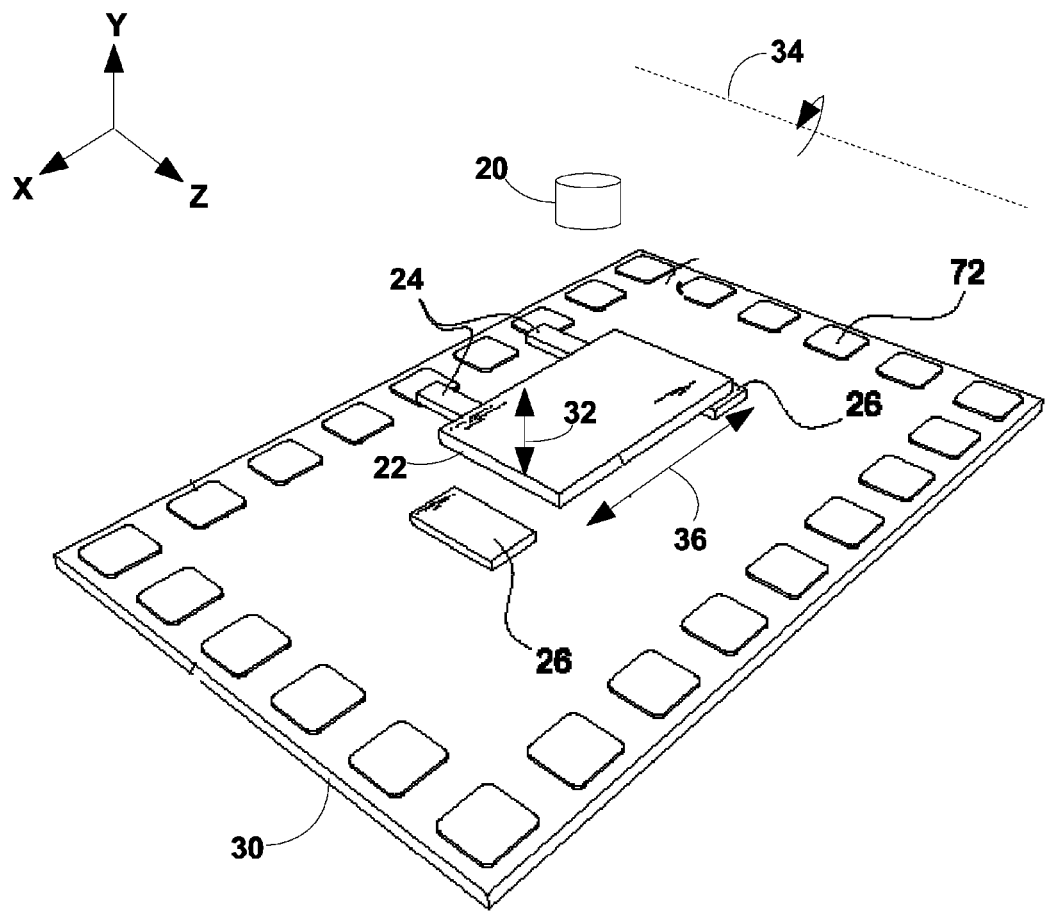
FIG. 1 is a schematic illustration of a prior art micro-optoelectromechanical system (MOEMS)

The following detailed description of the invention refers to the accompanying drawings referred to above. Dimensions of components and features shown in the figures are chosen for convenience or clarity of presentation and are not necessarily shown to scale. Wherever possible, the same reference numbers are used throughout the drawings and the following description to refer to the same and like parts.

DETAILED DESCRIPTION OF EMBODIMENTS OF THE PRESENT INVENTION

The present invention relates to designs and configurations for reducing or eliminating stray light in MOEMS and/or reducing or eliminating the effect of direct and indirect (stray) parasitic light on the peripheral electronics of MOEMS. Below, a number of exemplary solutions are described by way of example on a micro-machined optical inertial sensing device. It should be noted that embodiments of the invention can be implemented on a variety of MOEMS devices.

Referring first to FIG. 1, FIGS. 2A and 2B, and FIGS. 3A and 3B, there is shown a typical (prior art) micro-machined optical inertial sensing device. The device comprises a light source 20; a proof mass 22 suspended on cantilevers 24; and photodiodes 26 disposed on a silicon integrated circuit (IC)

substrate 30. Proof mass 22 includes handles 100 which are used to help handle the proof mass (FIGS. 3A and 3B).

Proof mass 22 is excited vertically along y-axis 32. As a result of rotational movement along z-axis 34 the proof mass moves or vibrates along the x-axis 36 in response to the Coriolis Effect. The movement of proof mass 22 along x-axis is evaluated by measuring a corresponding light flux change detected by photodiodes 26.

Figure 2A:
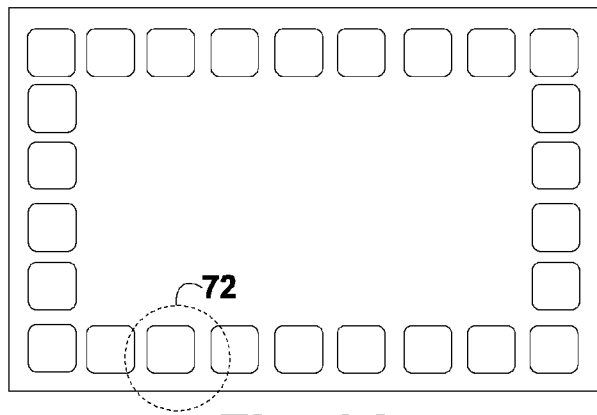
FIG. 2A schematically illustrates a silicon integrated circuit (IC) substrate of the prior art MOEMS of FIG. 1.
Figure 2B:
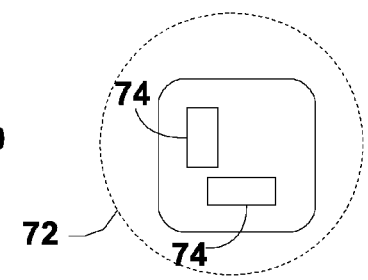
FIG. 2B schematically illustrates an enlarged view of a pad including ESD protection diodes of the prior art MOEMS of FIG. 1.

FIG. 2A schematically illustrates silicon integrated circuit (IC) substrate 30 that includes several pads 72. Referring now to the enlarged sectional view in FIG. 2B, each pad 72 typically includes one or more ESD protection diodes 74 which are typically sensitive to light. Thus, light shed by source 20, on pads 72 causes ESD protection diodes 74 to generate an undesired electrical current.

Figure 3A:
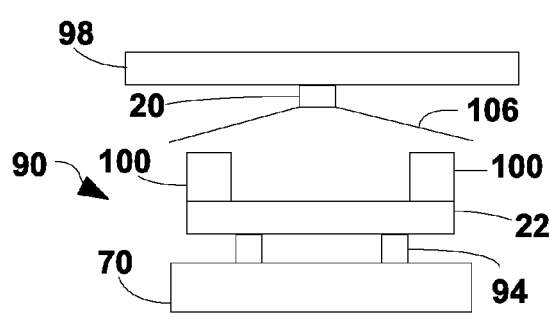
FIG. 3A-3B schematically illustrate a sectional side view of a micro-electromechanical optical inertial sensing device as known in the art.
Figure 3B:
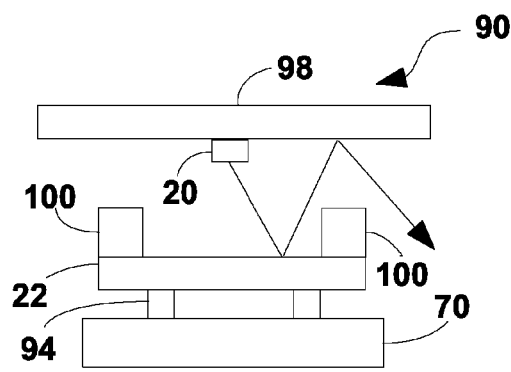

FIGS. 3A and 3B illustrate a sectional side view of a micro-electromechanical optical inertial sensing device 90 as known in the art. Device 90 includes suspended proof mass 22, typically fabricated by micromachining of silicon or silicon on chip (SOI) wafer with predetermined thickness. Proof mass 22 is suspended over chip 70 (e.g. CMOS chip). Spacer element 94 forms the functional gap for the proof mass motion over chip 70. Device 90 further includes one or more light sources 20 attached to a substrate 98.

In FIGS. 3A and 3B there is further illustrated two examples of how (undesired) parasitic light/illumination can be produced in a MOEMS; namely, as a result of a wide distribution of light from light source 20 or from light reflecting off proof mass 22 and silicon IC substrate 30.

Some MOEMS devices employ more than one active light sensor in order to transduce the incident light into electrical currents. For example, in the micro-machined optical inertial sensing device that is shown in FIG. 1, photo diodes 26 transduce the incident light into two electrical currents.

In cases in which parasitic light from light source 20 is distributed unevenly on pads such as pad 72, the parasitic light produces a current which corrupts (changes) the true current values flowing through the corresponding pads. This corruption may result also in limited measurement range, limited dynamic range of amplifiers and may even cause the amplifier(s) to saturate.

In accordance with some embodiments of the present invention, the outputs of the electrical signals that represents the measurement over the photodiodes 26 are connected to pads that are disposed whereby intensity of illumination on the ESD protection diodes 74 are distributed evenly and consequently the total electrical currents of ESD protection diodes 74 are substantially the same through each pad 72. In accordance with some embodiments of the present invention a light absorbing element (e.g. dark colored glue, polymer, sticker, paste and so on), is applied to the pads in order to limit the light impinging on the ESD protection diodes.

Figure 4:
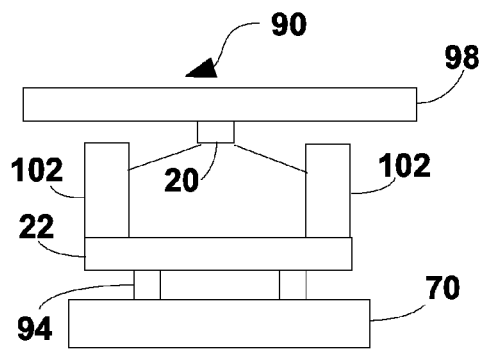
FIG. 4 is a schematic sectional side view of a MOEMS device according to a first embodiment of the present invention.

In accordance with another embodiment of the present invention, light is prevented totally or partially from arriving at the pads by adding on the pads, at some stage of the integrated circuit production, a deposition layer that absorbs light. Referring now to FIG. 4, in accordance with some embodiments of the present invention, in order to reduce the direct and indirect light that arrives from light source 20 to the peripheral electronics (e.g. pads 72 or ESD diodes 74) of chip 70, thick or tall handles 102 are disposed on the proof mass laterally outboard of illumination source 20.

Referring again to FIG. 3A, light source 20 is illustrated as a wide angle illumination source such as a light emitting diode (LED). The light beam of this wide angle illumination source is designated by lines 106. As the beams 106 stray outside of their intended path, direct and indirect parasitic illumination may arrive at peripheral electronics of device 90.

Figure 5:
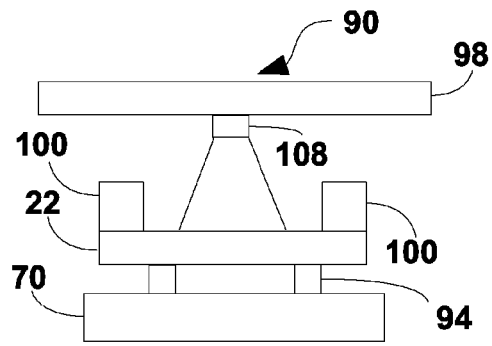
FIG. 5 is a schematic sectional side view of the present MOEMS device which includes a VCSEL light source.

In accordance with some embodiments of the present invention, a light source is used which has a narrow beam. Beneficially, a collimated beam of light is used in the MOEMS, (e.g. using a collimator 110). FIG. 5 shows a schematic sectional side view of a micro-electromechanical optical inertial sensing device 90 that includes a narrow beam light source, e.g. Vertical Cavity Surface Emitting Laser (VCSEL) 108. FIG. 6 illustrates a schematic sectional side view of micro-electromechanical optical inertial sensing device 90 that includes collimator 110 disposed in the path of wide beam light source, e.g. LED 20 is used as explained above.

Referring now to FIG. 7, in accordance with some embodiments of the present invention, the MOEMS includes substrate 98 with a recess adapted to house/hold light source 20 thus narrowing the beam.

FIG. 8 shows a MOEMS in accordance with an embodiment of the invention wherein substrate 98 includes one or more thin light absorbent layers 112 deposited on the bottom surface of the substrate and/or on the upper surface of proof-mass 22. There are many known methods for depositing a thin light absorbent layer such as layer 112, e.g. physical vapor deposition (PVD), chemical vapor deposition (CVD), diffusion, ion implantation, liquid chemical reaction, surface treatment, condensation, dry etching and wet etching. In some embodiments of the present invention, a stack of thin layers is used in order to create a Fabry-Perot filter to reduce parasitic light.

FIGS. 9 and 10 schematically depict substrate 98 with a plurality of light sources 20. Optical limiters 114 made of silicon and/or other materials are connected to substrate 98. The term "optical limiter" in accordance with the present invention is a member that used to limit the illuminate of light source to a desired region. Limiter(s) 114 may have a dry or wet etching with or without a light absorbing coating.

In FIG. 9, optical limiters are shown connected around a group of light sources 20. FIG. 10 shows a top view of substrate 98 in which light sources 20 are connected thereto and optical limiters 114 are connected around each light source. These optical limiter arrangements reduce parasitic light.

In some embodiments of the present invention, substrate 98 is made of material that absorbs the LED wave lengths toward a cover of the MOEMS or a package of the MOEMS, thus, reducing parasitic light.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A micro-opto-electro-mechanical system comprising:
   a proof mass;
   at least one illumination source for providing illumination;
   an illumination detector;
   peripheral electronics; and
   an illumination mitigating mechanism for mitigating the effect of illumination emitted from the at least one illumination source on the peripheral electronics.

2. The system according to claim 1, wherein the illumination mitigating mechanism comprises thick or tall handles disposed on the proof mass laterally outboard of the illumination source.

3. The system according to claim 1, wherein the illumination mitigating mechanism comprises an illumination collimating device.

4. The system according to claim 1, wherein the illumination source is disposed in a recess of a substrate of the system.

5. The system according to claim 1, wherein the illumination mitigating mechanism comprises a narrow beam light source.

6. The system according to claim 5, wherein said narrow beam light source is a Vertical Cavity Surface Emitting Laser.

7. The system according to claim 1, wherein the illumination mitigating mechanism comprises an illumination absorbing layer disposed on the bottom surface of the substrate.

8. The system according to claim 1, wherein optical limiters are disposed around each illumination source.

9. The system according to claim 1, wherein optical limiters are disposed around a group of illumination sources.

10. The system according to claim 1, wherein a light absorbing element is applied to the peripheral electronics of the system in order to limit the light impinging on said peripheral electronics.

11. The system according to claim 1, wherein light is at least partially prevented from arriving to the peripheral electronics by adding a deposition layer that absorbs light to an integrated circuit of the system.

* * * * *